(12) United States Patent
Maki (10) Patent No.: US 12,480,260 B2
(45) Date of Patent: Nov. 25, 2025

(54) SHEAR RESISTANT DRAIN SYSTEM FOR IMPROVING WEAK FOUNDATION SOILS

(71) Applicant: TBT ENGINEERING LIMITED, Thunder Bay (CA)

(72) Inventor: Gordon Christopher Maki, Thunder Bay (CA)

(73) Assignee: TBT Engineering Limited, Thunder Bay (CA)

( * ) Notice: Subject to any disclaimer, the term of this patent is extended or adjusted under 35 U.S.C. 154(b) by 621 days.

(21) Appl. No.: 17/521,409

(22) Filed: Nov. 8, 2021

(65) Prior Publication Data

US 2022/0145545 A1 May 12, 2022

Related U.S. Application Data (60) Provisional application No. 63/111,348, filed on Nov. 9, 2020.

(51) Int. Cl.
 *E02D 3/10* (2006.01)
 *E01B 1/00* (2006.01)
 *E01B 27/02* (2006.01)

(52) U.S. Cl.
 CPC .............. *E01B 1/008* (2013.01); *E01B 27/02* (2013.01); *E02D 3/10* (2013.01)

(58) Field of Classification Search
 CPC .................................... E02D 3/10; E02D 3/02
 See application file for complete search history.

(56) References Cited

U.S. PATENT DOCUMENTS

| 3,386,251 | A | * | 6/1968 | Casagrande | ............ E02D 3/103 405/302.4 |
| 5,697,730 | A | * | 12/1997 | Goering | .................... E01C 3/06 404/82 |
| 10,844,568 | B1 | * | 11/2020 | Gupta | ........................ E02D 7/02 |
| 2006/0133897 | A1 | * | 6/2006 | Allard | ..................... E02D 17/20 405/36 |
| 2011/0280669 | A1 | * | 11/2011 | Moroschan | ............... E02D 3/00 405/271 |
| 2017/0284031 | A1 | * | 10/2017 | Maki | ........................ E02D 3/10 |

FOREIGN PATENT DOCUMENTS

| CA | 2957293 | | 9/2017 |
| DE | 19848846 | | 4/2000 |
| DE | 10333613 | | 2/2005 |
| EP | 0505218 | | 9/1992 |
| KR | 20100083318 | * | 7/2010 |

* cited by examiner

Primary Examiner — Sean D Andrish
(74) Attorney, Agent, or Firm — Ryan W. Dupuis; Michael R. Williams; Ade & Company Inc.

(57) ABSTRACT

Shear drain devices are used to prepare ground with a weak soil layer to receive a static load, for example a structural foundation or a soil embankment, in which the ground includes a weak soil layer that consists of fine grained soils over a base layer. Each shear drain devices each include an elongate perforated pipe member, a surrounding reinforcement member providing tensile reinforcement and aggregate fill. The ground is prepared by (i) inserting the pipe members and reinforcement members in an upright orientation within the fine grained soils such that fluid in the surrounding soil can readily pass into the pipe members and (ii) subsequently placing the aggregate fill in the pipe members to occupy the hollow interior thereof such that the resulting shear drain devices increase a shear strength of the weak soil layer.

18 Claims, 9 Drawing Sheets

SHEAR RESISTANT DRAIN SYSTEM FOR IMPROVING WEAK FOUNDATION SOILS

This application claims the benefit under 35 U.S.C. 119(e) of U.S. provisional application Ser. No. 63/111,348, filed Nov. 9, 2020.

FIELD OF THE INVENTION

The present invention relates to a system for strengthening fine grained soils, including silt and clay soils, so that the fine grained soils forms a suitable foundation to support a static load thereon such as an embankment or structural foundation, and more particularly the present invention relates to a system of structures placed within the fine grained soils that both (i) shorten the drainage path to relieve porewater pressure within the fine grained soils, (ii) increase the shear resistance of the fine grain soils, and (iii) transfer loads to deeper soil strata.

BACKGROUND

Common problems associated with construction on soft and weak foundation soils include excessive long-term settlements and low levels of bearing capacity or global stability. This often leads to delays in construction to allow settlements to occur during the construction process (often through site preloading) and/or the use of staged construction methods (delays in construction sequencing to allow the soils to strengthen over time), both contributing to significant increased construction costs.

Ground improvement measures are often applied to expedite site settlements and/or improve settlement performance of the ground. One of the more common methods is the use of a site preload. Depending on the site conditions and project schedule, site preloading may also incorporate the use of a surcharge (additional fills placed over the design level) to expedite preload durations. Where preloading durations need to be expedited further, other methods are employed to expedite the settlement times and/or reduce settlements. Common methods to improve the performance of a preload include the use of sand drains, wick drains, vibro-compacted stone columns, or reinforced stone columns. The sand drains and wick drains primarily target increasing the rate of excess porewater pressures dissipation (which in turn expedites settlements and indirectly increases the effective shear strength of the soils over time). The vibro-compacted and reinforced stone columns can provide some soil densification during installation of the aggregate and some load transfer is achieved which can reduce the overall magnitude of settlement. There will additionally be some limited improvement in shear strength through densification.

Ground improvement measures are often used to expedite construction over weak soils. Where weak and soft foundation soils exist, global stability (rotational shear failure extending into the foundation soils) for significant fill heights and embankments can be a critical issue. During fill placement, the effective stresses near the toe of the fills and/or embankments decreases due to the development of excess porewater pressures. The excess porewater pressures reduce the effective shear strength of the soil and increase the risk of global instability. Construction may need to be carried out in stages to allow the dissipation of the excess porewater pressures. For example, a 10 m high embankment may require construction in smaller lifts with delays between each lift to allow for settlement and porewater pressure dissipation to occur which increases the effective shear strength of the soils to a point where the embankment can safely support an additional lift. Where lengthy delays are required between stages, ground improvement measure are often employed to dissipate porewater pressures faster. Common methods to improve the performance for staged construction are similar to that for site preloading and include the use of sand drains, wick drains, vibro-compacted stone columns, or reinforced stone columns. The sand drains and wick drains primarily increase the rate of excess porewater pressures dissipation. The vibro-compacted and reinforced stone columns can also provide some soil densification during installation of the soils and some load transfer which can reduce the overall increase in porewater pressure and magnitude of settlement. Further, there will be some limited improvement in shear strength through densification.

Ground improvement may also be considered to improve the capacity of shallow foundations such footings and/or mat foundations. Where weak and compressible soils exist below a foundation, improvement in shear resistance can increase bearing capacity and transfer of loads to deeper soil strata can improve settlement performance.

SUMMARY OF THE INVENTION

According to one aspect of the invention there is provided a method of preparing ground to receive a static load in which the ground includes a weak soil layer consisting of fine grained soils over a base layer, the method comprising:
providing a plurality of elongate pipe members, each including a hollow interior and a plurality of openings therein;
providing a reinforcing member extending about each pipe member so as to provide tensile reinforcement at least in a circumferential direction about the pipe member;
inserting the pipe members in an upright orientation within the fine grained soils of the weak soil layer such that fluid can readily pass through the openings in the pipe members from the fine grained soils surrounding the pipe member into the hollow interior of the pipe members;
providing aggregate fill occupying the hollow interior of each pipe member such that the pipe member, the reinforcing member and the aggregate collectively define a shear drain device that increases a shear strength of the fine grained soils within the weak soil layer.

The fine grained soils within the weak soil layer typically consist primarily of silt and/or clay.

The system preferably includes a preload layer of material placed over the shear drain devices in the weak soil layer, for example a soil embankment. The system may also be used without preloading, for example to improve settlement performance and bearing capacity of a shallow foundation.

According to a second aspect of the present invention there is provided shear resistant drain system for preparing ground to receive a static load in which the ground includes a weak soil layer consisting of fine grained soils over a base layer, the system comprising:
a plurality of shear drain devices inserted in an upright orientation within the fine grained soils, each shear drain device comprising:
a pipe member formed of semi-rigid material and having a hollow interior;
aggregate fill occupying the hollow interior of the pipe member;

a tensile reinforcing member extending about the pipe member providing tensile reinforcement at least in a circumferential direction about the pipe member; and a plurality of openings in the pipe member which are arranged to allow communication of fluid from the fine grained soils surrounding the pipe member into the hollow interior of the pipe member so as to be arranged to reduce porewater pressure within the fine grained soils when the ground is loaded.

When there is provided a dense layer of aggregate material laid over the weak soil layer, the shear drain devices may be placed to extend upwardly through the dense layer.

A preload layer of material may be placed over the shear drain devices that are in the weak soil layer. For example the preload layer of material may comprise a soil embankment. In this instance, the shear drain devices in the fine grained soils of the weak soil layer may be located in proximity to a boundary of the soil embankment. More particularly, the shear drain devices may be located at a first distance to adjacent ones of the shear drain devices at a central location, while the shear drain devices are located at a second distance to adjacent ones of the shear drain devices at the boundary of the soil embankment, in which the first distance is greater than the second distance.

The shear drain devices are preferably located within the fine grained soils so as to traverse a shear plane associated with the preload layer of material.

In some embodiments, subsequent to settling of the fine grained soils in the weak soil layer, a region surrounding the aggregate fill within the pipe members of the shear drain devices may be filled with concrete.

When the base layer comprises dense soil having a greater shear strength than the fine grained soils of the weak soil layer, the shear drain devices may be further placed such that the shear drain devices terminate at respective bottom ends within the base layer.

A filter member may also extend as a continuous layer about the pipe member of each shear drain device in which the filter member having an aperture size which is suitable to prevent entry of silt into the openings of the pipe member. Preferably the filter member and the tensile reinforcing member on the pipe member of each shear drain device so as to allow slippage between at least two of the filter member, the tensile reinforcing member and the pipe member in a longitudinal direction of the shear drain device.

The pipe member of each shear drain device may comprises a perforated, corrugated plastic pipe.

Preferably each shear drain device has a compressive strength in an axial direction which is greater than a corresponding compressive strength of the fine grained soils surrounding the shear drain device.

Each shear drain device may be placed such that a region of the fine grained soils surrounding each shear drain device is densified by a displacement of soil resulting from insertion of the shear drain device into the fine grained soils.

The shear drain device takes ground improvement techniques to the next level. By introducing an engineered composite system, we have improved the drainage characteristics of the wick and sand drains and improved upon the load transfer and shear resistance capabilities of the vibro-compacted and reinforced stone columns. A semi rigid pipe coupled with a reinforcing mesh and filter medium improves the vertical and lateral stiffness of the column to improve load transfer and shear resistance. The shear drain device not only provides increased soil shear strength through expedited porewater pressure dissipation, but also provides mechanical shear resistance by the composite system including engineered materials and constraints. The aggregate filter medium feature allows the shear drain device to be used in layered soils including sand, clay and/or silt layers without the risk of soil migration into the drain itself which can reduce the effectiveness of the drain and lead to settlements due to ground loss. The shear drain device can be installed using various methods (to densify soils, or not densify the soils) as required for a specified project requirement. It should be noted that in some cases (for example staged construction) the increase in porewater pressure through densification may need to be avoided or minimized as this can reduce the shear strength of the soil over the short-term.

The main benefits of shear drain devices are: (i) Reduced loading on compressible subgrade (load capacity of shear drain devices), (ii) Expedited excess porewater pressure dissipation; (iii) Soil densification; and (iv) Increased shear resistance.

The shear drain device will reduce and expedite ground settlements, improve load bearing (like micro piles) and increase the shear strength of the foundation soils (to improve global stability) through various contributions. The shear drain device itself consist of a semi-rigid perforated pipe surrounded by a tensile reinforcing mesh. A filter fabric material is used between the pipe and reinforcing mesh. The pipe is filled with aggregate that is more permeable that the neighboring soil. The diameter of the drain can be selected based on the desired effect and will typically range from 0.1 m diameter to 0.5 m diameter. The shear drain device is engineered to be several times stiffer (axial and flexural) than the stiffness of the soil subgrade, but not fully rigid. There is a degree of slippage allowed between the various layers to reduce downdrag effects. The overall stiffness of the Shear drain device can be engineered by adjusting the gap between the reinforcing mesh and semi-rigid perforated pipe and by adjusting the type and placement method of the aggregate medium.

The proposed ground improvement technique will involve the installation of shear drain devices in a designed pattern over the area of interest. The shear drain devices consist of vertical columnar zones of relatively highly permeable materials. The installation pattern will be designed to achieve stiffening and improved drainage of the ground for various types of foundation solutions. The drains extend through problematically soft/weak soil layers. The shear drain devices are terminated within the natural ground below the problematic soil layer with the depth of termination depending on the type and condition of underlying soil. The shear drain devices will be installed using displacement or non-displacement drilling methods.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Referring to the accompanying figures there is illustrated a shear resistant drain system generally indicated by reference numeral 10. The system 10 is particularly suited for installation in weak soil layers 11 to prepare the weak soils as foundation soils for supporting a static load or structure thereon, such as an embankment 12 supporting a roadway or other structural foundations 13 for supporting buildings, bridges or other structures and the like thereon.

When a region of ground to be used as a foundation for a static load or structure supported thereon comprises weak soil layers formed of fine grained soils, the system 10 prepares the fine grained soils by shortening the drainage path to relieve porewater pressure within the fine grained soils, and increasing the shear resistance of the fine grained soils.

Within the context of the present invention, fine grained soils are understood to consist primarily of silt and/or clay such that 50% or more material would pass through a No. 200 sieve such that the fine grained soil is impermeable due to its small particles size. The fine grained soils of the weak soil layer are further defined as being slow draining, compressible and having weak shear resistance so as to be unsuitable for use as a foundation without further preparation.

Installation of the system 10 may initially include removing an upper surface layer of soil to replace the upper surface layer of soil with a dense layer 14 of aggregate material including sand and gravel so that the dense layer 14 overlays the weak soil layers and forms an upper boundary of the fine grained soils. The upper surface of the dense layer 14 may be at the same elevation or above the elevation of a surrounding ground surface that does not support the soil embankment 12 thereon.

A lower boundary of the weak soil layers of fine grained soils is defined by a base layer 15 of competent soil below the weak soil layers 11. The base layer comprises dense soil having a greater shear strength than the fine grained soils of the weak soil layer and a greater permeability than the fine grained soils.

In the illustrated embodiment, the weak soil layers include layers of soft clay and a layer of sand and silt; however, in further embodiments, the weak soil layers may comprise a plurality of different layers each being formed of different proportions of sand, silt, and or clay so that the soil consists primarily of silt or clay as described above.

The system 10 initially prepares the weak soil layers as a suitable foundation by inserting a plurality of shear drain devices 16 into the weak soil layers. The shear drain devices 16 span across the dense layer 14 above the weak soil layers and span across the weak soil layers 11, such that a bottom end of each shear drain device 16 terminates within the base layer 15 below the weak soil layers.

A preload layer of material can then be placed overtop of the dense layer 14 so that the preload layer of material spans over the shear drain devices 16 within the weak soil layers and provides a downward loading force onto both the shear drain devices and the weak soil layers within which the shear drain devices are located. The preload layer of material may be in the form of the soil embankment 12 so that a subsequent structure such as a roadway or building structure can then be constructed on top of the preload layer of material. A surcharge layer may also be considered to expedite settlements. The shear drain devices 16 are placed at spaced apart locations within the weak soil layers in the region underlying the soil embankment 12, including in proximity to the boundaries of the soil embankment. The shear drain devices may be located at a first distance to adjacent ones of the shear drain devices at a central location relative to the embankment 12 and located at a second distance to adjacent ones of the shear drain devices at the boundary of the soil embankment. In this instance, the first distance is preferable greater than the second distance so that the shear drain devices are more densely located near the boundaries of an embankment.

Figure 5A:
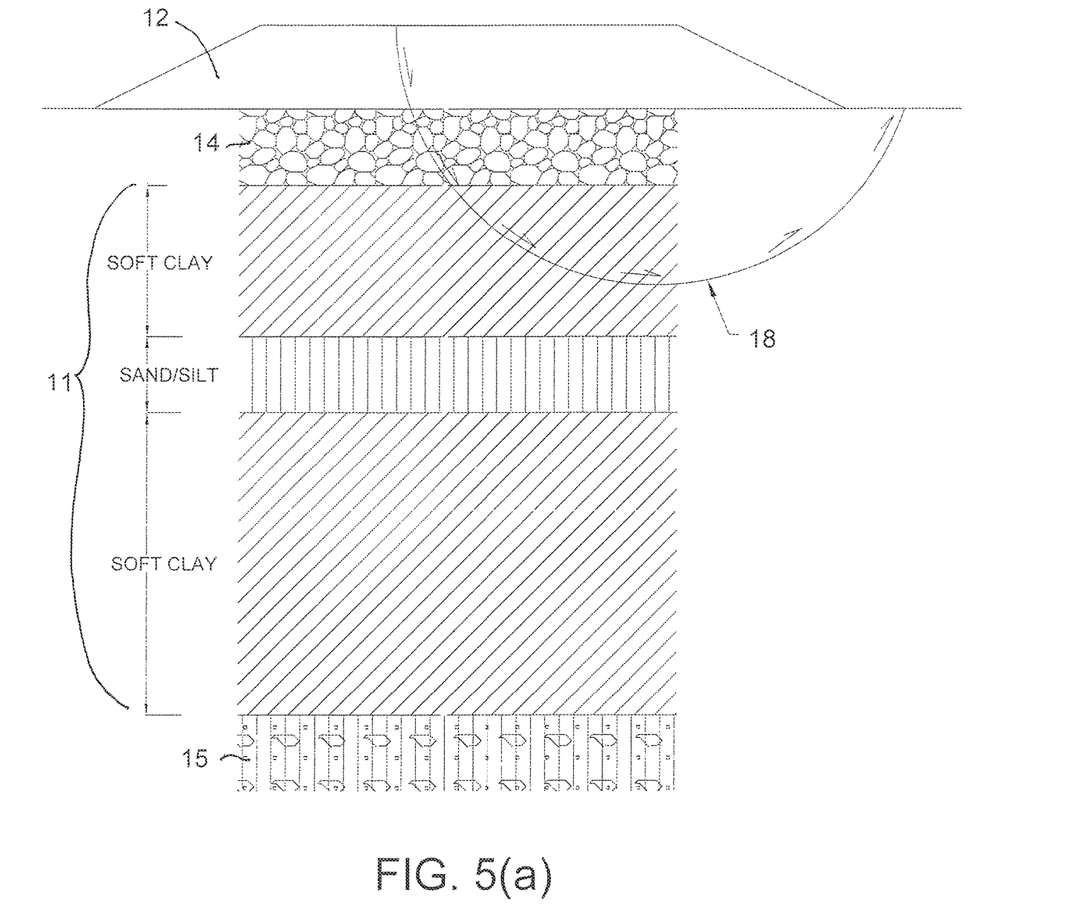
FIG. 5(a) is a schematic representation of a shear plane within weak foundation soils resulting from placement of an embankment on the foundation soils before the installation of the shear resistant drain system.
Figures 5B, 5C:
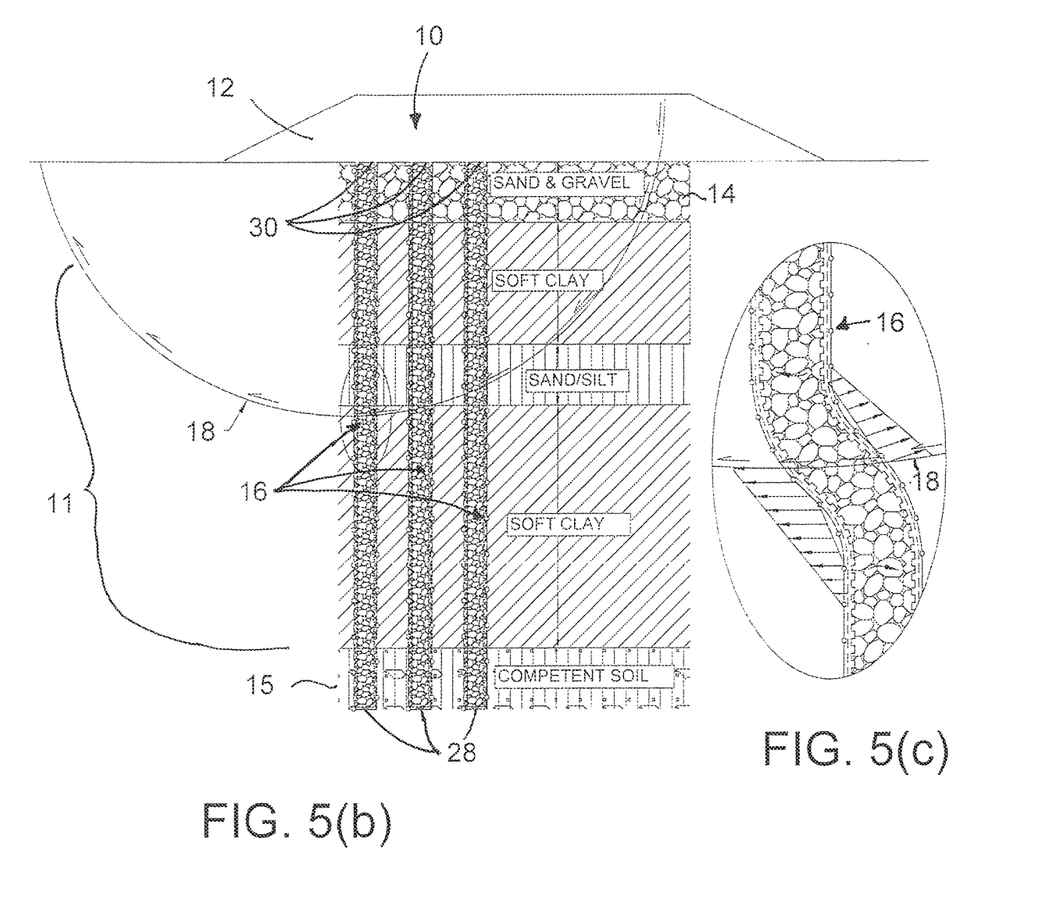
FIG. 5(b) is a schematic representation of shear drain devices of the shear resistant drain system extending across the shear plane resulting from the embankment in FIG. 5(a)
FIG. 5(c) is an enlarged view of a portion of FIG. 5(b) schematically representing a portion of one of the shear drain devices extending across the shear plane resulting from the embankment in FIG. 5(a)
Figure 6A:
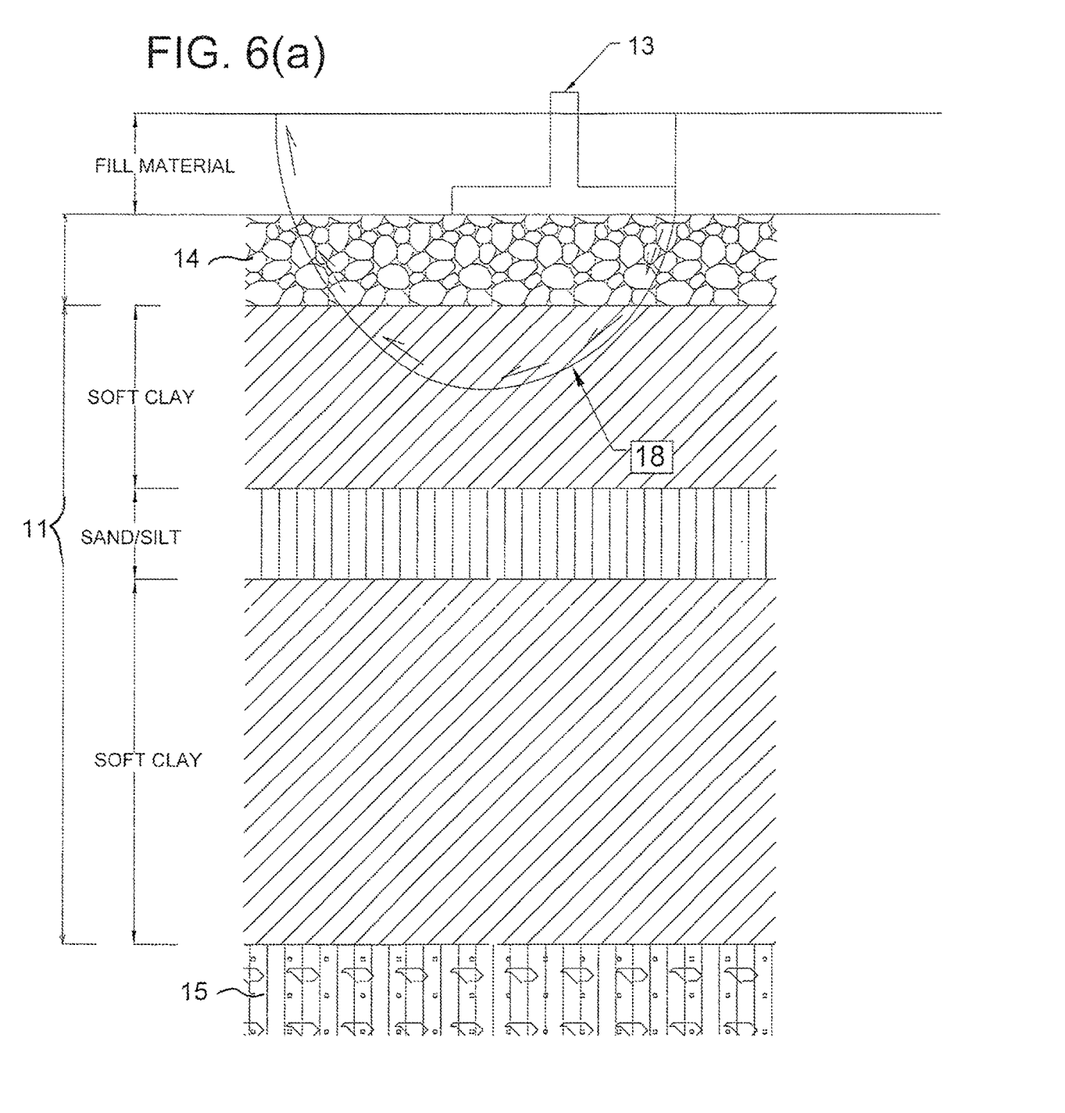
FIG. 6(a) is a schematic representation of a shear plane within weak foundation soils resulting from placement of structural foundation such as a footing for mat foundation on the foundation soils before the installation of the shear resistant drain system.
Figures 6B, 6C:
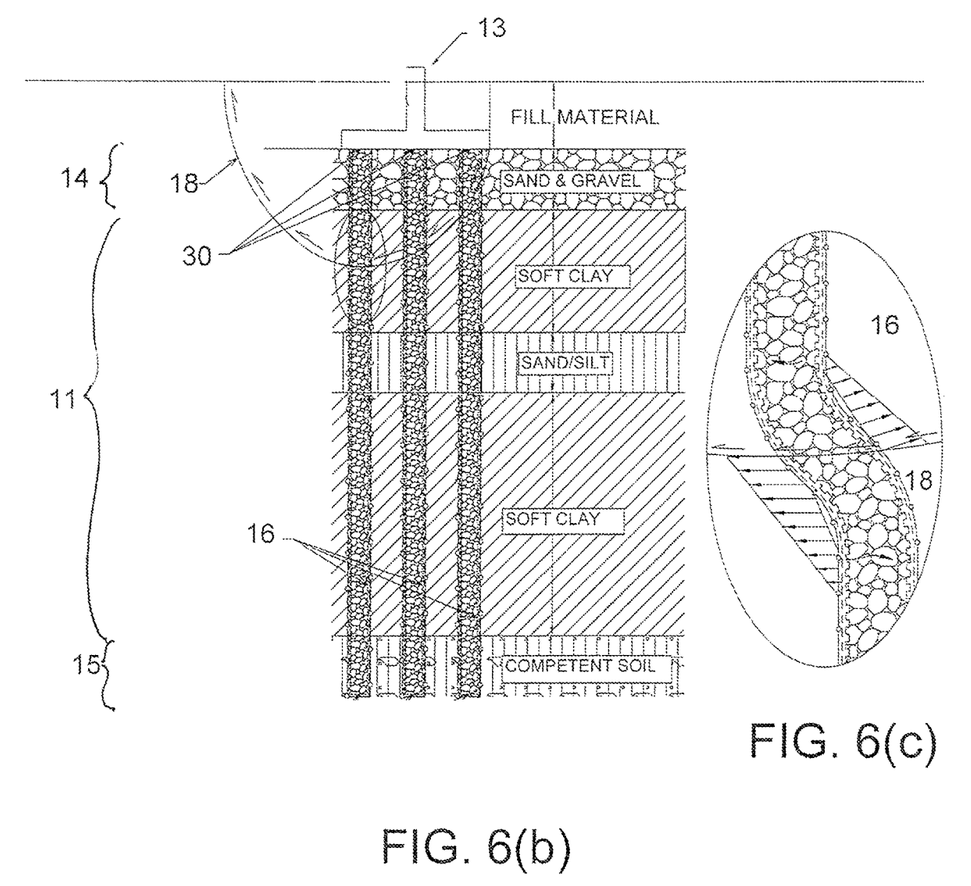
FIG. 6(b) is a schematic representation of shear drain devices of the shear resistant drain system extending across the shear plane resulting from the footing or mat foundation in FIG. 6(a)
FIG. 6(c) is an enlarged view of a portion of FIG. 6(b) schematically representing a portion of one of the shear drain devices extending across the shear plane resulting from the static load in FIG. 6(a)

As shown in FIGS. 5(a) and 6(a), the placement of a static load such as the preload layer, soil embankment 12, or structural foundation 13 (for example a footing or a mat foundation) above the weak soil layers has an associated shear plane 18 acting to push downwardly on the weak soil layers below the soil embankment, which in turn acts to displace some of the fine grained soils outwardly and upwardly in the adjacent ground surface areas adjacent to the soil embankment. The shear drain devices are installed so that the shear drain devices traverse and span across the shear plane to resist lateral displacement of soil within the weak soil layer, and thereby increase the shear resistance of the weak soil layer as illustrated in FIGS. 5(b) and 6(b).

Figure 1:
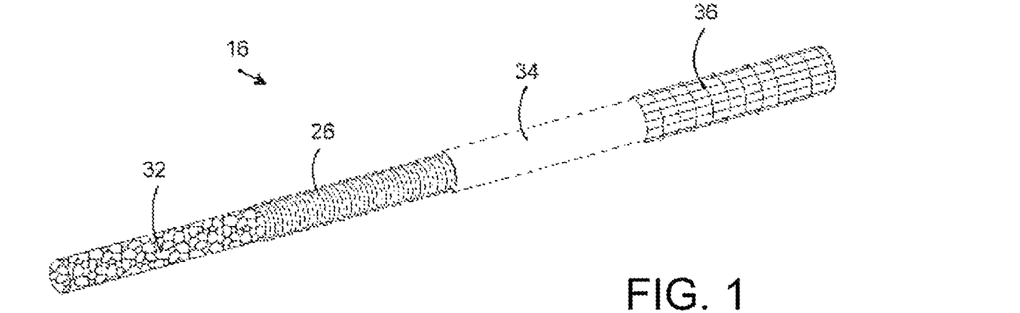
FIG. 1 is a perspective view of one of the shear drain devices of the shear resistant drain system used to prepare ground to receive a static load such as an embankment or a structural foundation according to the present invention.
Figure 2A:
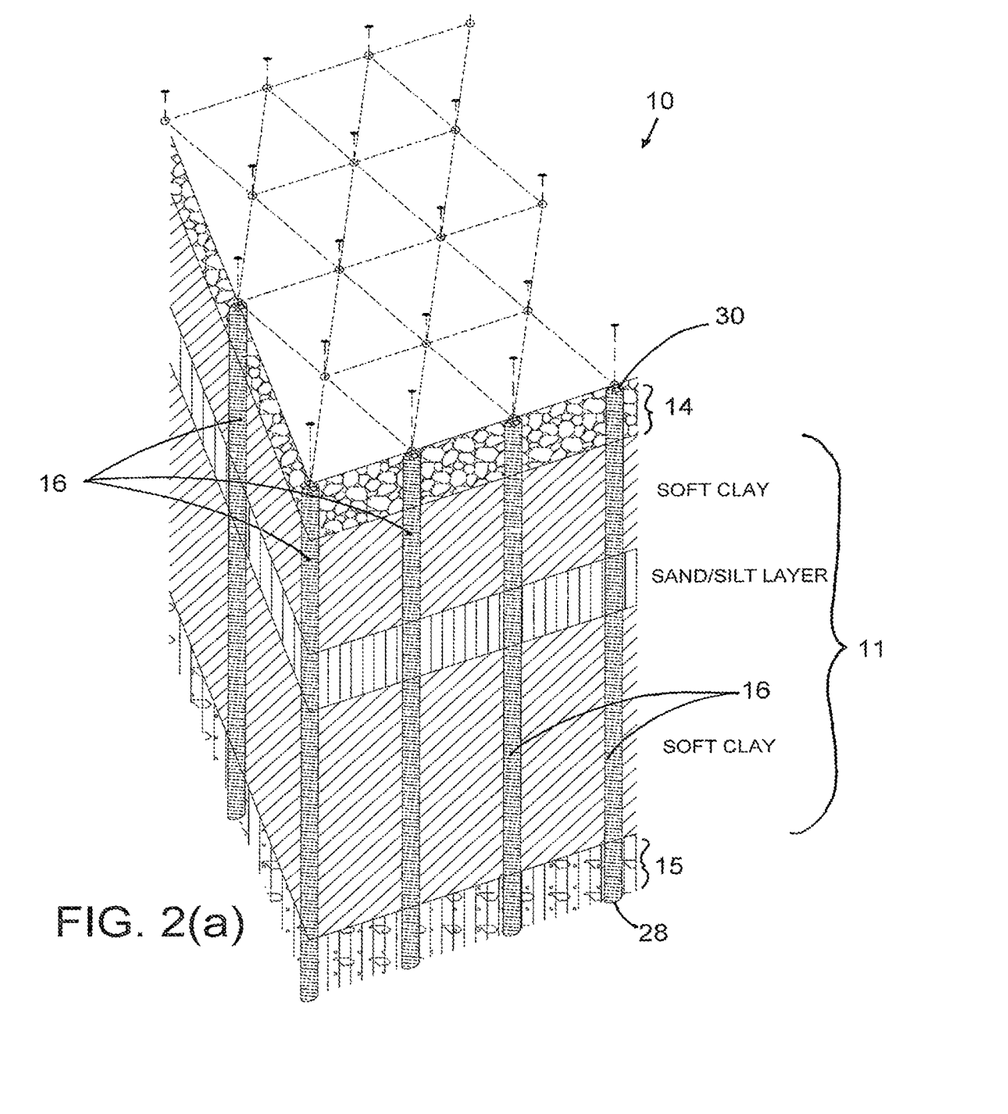
FIG. 2(a) is a perspective view of one example of an installation pattern of shear drain devices of the shear resistant drain system.
Figure 2B:
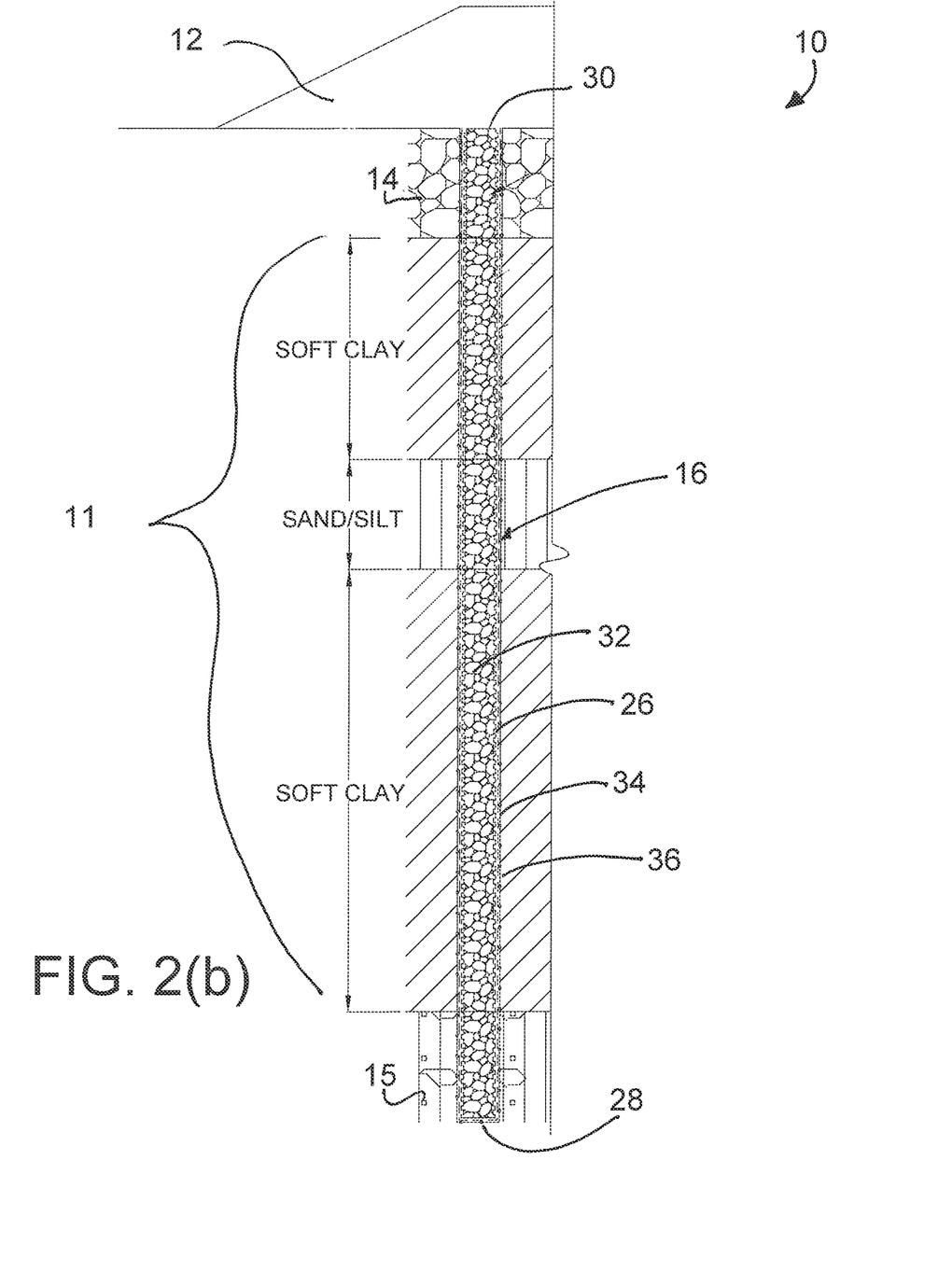
FIG. 2(b) is a sectional view of one of the shear drain devices of the shear resistant drain system once installed in prepared ground.

Each shear drain device 16 comprises an elongate semi-rigid pipe member 26 formed of corrugated plastic material which is perforated with openings according to the illustrated embodiment. The pipe includes a hollow interior spanning the full height of the pipe member between an open top end and a bottom end which is permanently or temporarily closed for insertion into the ground.

Each pipe member 26 is typically installed in a vertical orientation to span the full height of the weak soil layers 11 such that i) the bottom end 28 is located within the base layer 15 below the weak soil layers and ii) the top end 30 is located at a top of the dense layer 14. The top end of each pipe member is thus below the embankment. The diameter of each pipe member is typically less than 0.3 meters so as to be suitably sized for ease of insertion into the ground using conventional earth handling equipment.

The pipe of each pipe member is filled with an aggregate fill 32 which fully occupies the hollow interior of the pipe member. The size of the particles of the aggregate is selected to ensure that the hollow interior of each pipe member remains considerably more permeable than the surrounding fine grained soils.

A filter member 34 is provided as a sheet which is fully wrapped about the exterior of the pipe of each pipe member as a continuous layer such that the filter member spans over each of the openings of the perforated pipe. An aperture size of the filter material is considerably smaller than the size of the perforated openings in the pipe, and is smaller than a particle size of the particles in the weak soils so that the filter member acts to better prevent migration of fine grained materials surrounding the pipe members into the hollow interiors of the pipe members.

A reinforcing member comprising a mesh 36 is wrapped about the pipe of each pipe member at the exterior of the sheet of filter material to retain the filter material relative to the pipe and provide additional reinforcement to the pipe member. The reinforcing mesh may be a plastic mesh or a woven fiber geotextile material for example, so as to provide tensile reinforcement axially along each pipe member. The mesh 36 is formed as a tube so as to have a hoop strength greater than the pipe member to provide tensile reinforcement circumferentially about each pipe member as well.

The various layers forming the reinforcing member 36, the filter member 34, and the pipe member 26 are supported so as to allow some relative movement and slippage between the layers in the longitudinal or axial direction of the pipe member relative to one another and relative to the aggregate material within the pipe member. The pipe member 26 itself is corrugated so as to be axially compressible as well. In this manner, as the soil layers surrounding the shear drain member settle and compress, the downward friction force imposed upon the outermost layer of the shear drain member can cause the various layers to slip relative to one another without causing failure of the aggregate material acting as a pile within the interior of the shear drain member.

Each shear drain device has a compressive strength in an axial direction (derived primarily of the aggregate material 32 that is circumferentially contained by the pipe member and mesh) which is greater than a corresponding compressive strength of the fine grained soils surrounding the shear drain device and thus will not compress downwardly as much as the surrounding fine grain soils in response to the loading of a preload layer or soil embankment 12 above.

Each shear drain device remains flexible to allow some bending lateral shifting of the assembly at opposing ends and at intermediate locations along the length of the assembly relative to other portions of the assembly.

Each shear drain device 16 is installed by forming a suitable borehole into the fine grained soil in the weak soil layers 11, for example using an auger or a water jet and vacuum unit. The drain member is inserted to the appropriate depth as an assembly of the perforated pipe wrapped with the filter material and the reinforcing mesh. The bottom end may be temporarily or permanently closed by a cap or shoe for example for insertion into the ground. Once the drain member has been fully penetrated down into the fine grained soils of the weak soil layers, the hollow interior of the drain member is filled through the open top end of the drain member with the aggregate fill 32 having a suitable particle size to impart a desired degree of stiffness to the resulting assembly.

The horizontal spacing between adjacent drain members is selected to be much smaller than the existing drainage path of most of the fine grained soils of the weak soil layer 11 to the nearest permeable boundary. The permeable boundary is understood to be a boundary material adjacent the fine grained soils that is more permeable than the fine grained soils.

The installation of the shear resistant drain system typically begins with removing some soil from the surface of the site to be prepared to replace the removed soil with the dense layer 14. The shear drain devices 16 are then inserted into the ground to span across the weak soil layers 11. Upon installation of the devices 16, the site can be loaded with a static preload of material forming an embankment 12 to cause settling of the weak soil layers while the shear drain devices provide resistance to lateral shear. Moisture within the fine grained soils are urged by the static loading from the embankment 12 to migrate to the shear drain devices for drainage to allow the fine grained soils to settle. The settling of the fine grained soils surrounding the shear drain devices cause longitudinal slippage between the outermost layers of the drain devices 16 and the aggregate within the drain devices so that there are no excessive downward forces acting on the aggregate material 32 that might otherwise cause failure or rupture of the shear drain device 16. Subsequent to settling of the fine grained soils, the space within the hollow interior of each pipe member 26 that is not occupied by aggregate material can be filled with cement so that the cement fills the spaces between adjacent particles of the aggregate material. Once set, each shear drain device 16 forms a concrete pile within the foundation soils to increase the load capacity of the foundation soils.

Figure 3:
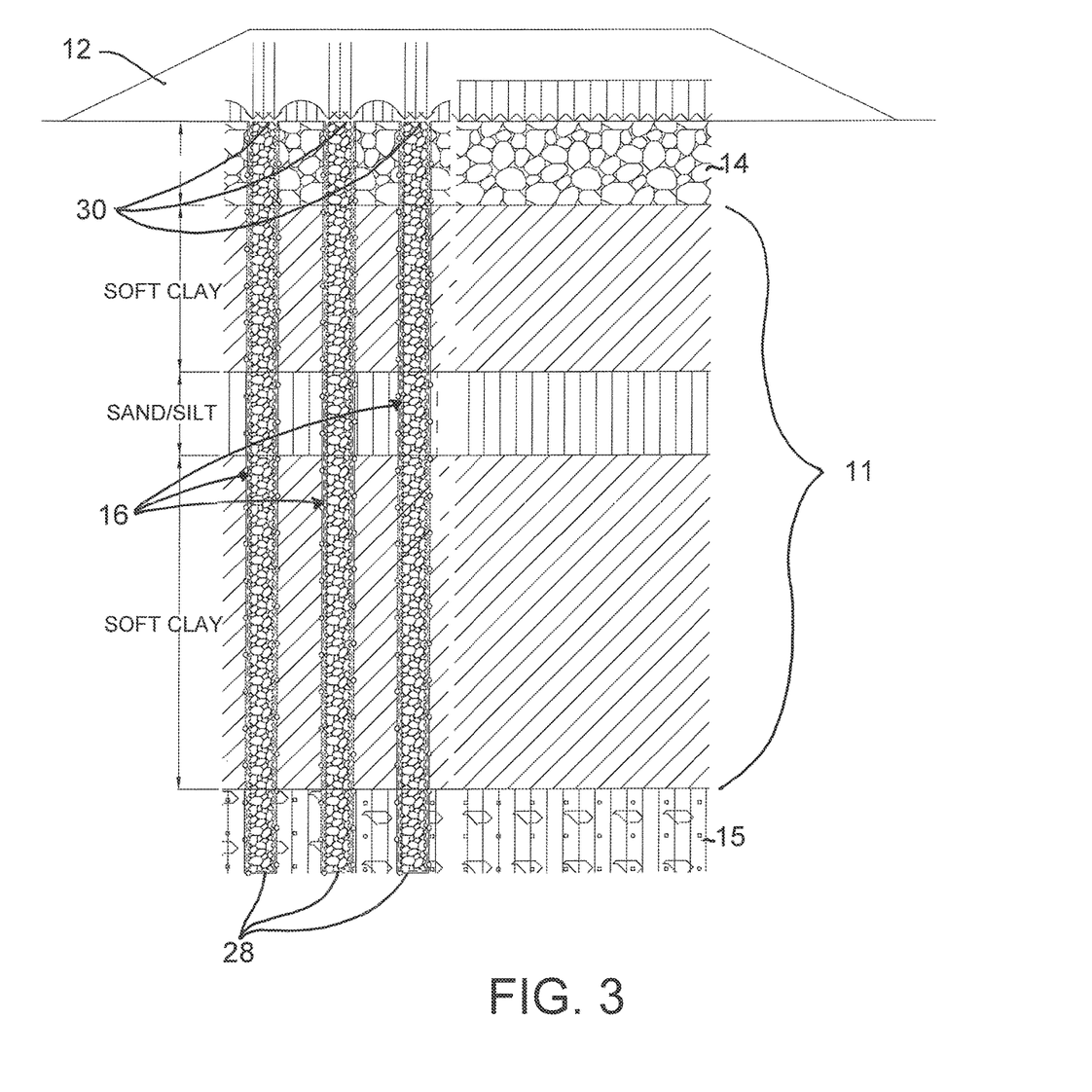
FIG. 3 is a sectional view of a plurality of shear drain devices along a first portion of an embankment to schematically represent loading on the first portion of the embankment relative to second portion of the embankment which does not have shear drain devices installed therein.
Figure 4:
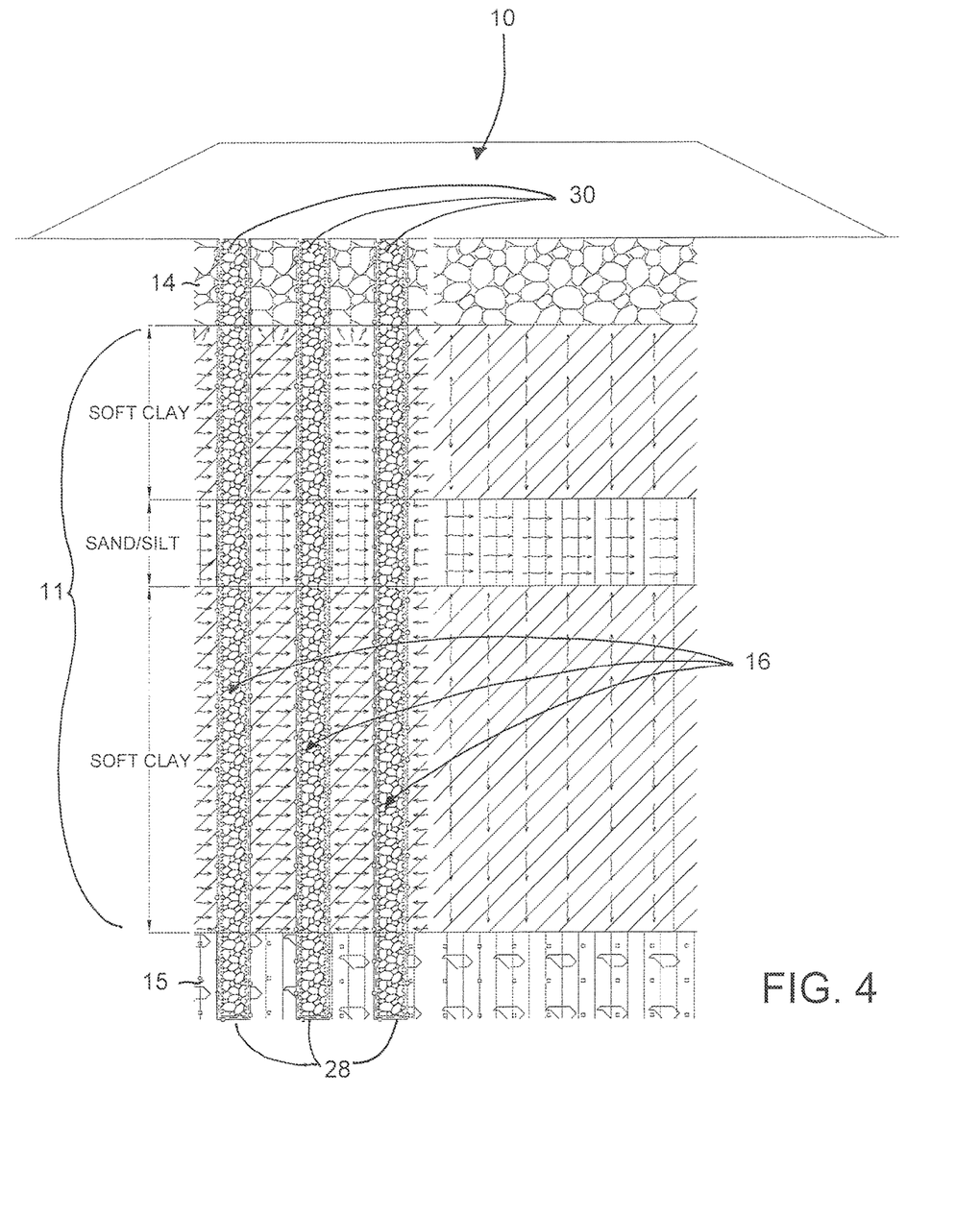
FIG. 4 is a sectional view of a plurality of shear drain devices along a first portion of an embankment to schematically represent a drainage path on the first portion of the embankment relative to second portion of the embankment which does not have shear drain devices installed therein.
Figure 7:
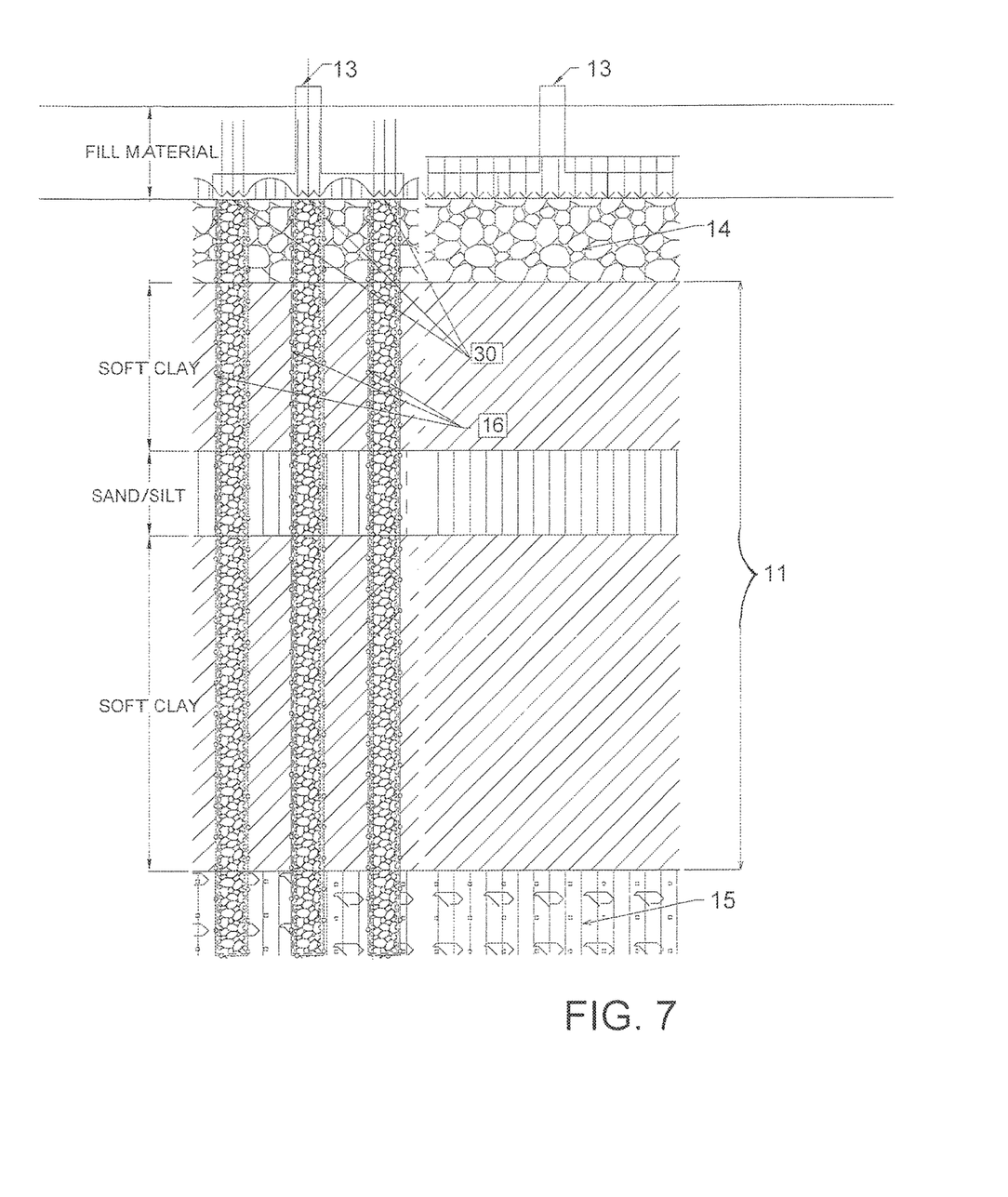
FIG. 7 is a sectional view of a plurality of shear drain devices below one footing or mat foundation to schematically represent the partial foundation load transfer through the shear drains to a deeper soil stratum relative to second footing or mat foundation which does not have shear drain devices installed therein.

The shear resistant drain system will reduce loading on weak/compressible soil strata. This is a desirable feature as it will reduce the overall foundation settlements, FIGS. 3 and 7.

The reduction of loading on the soft soil subgrades can be attributed to the Shear resistant drain systems' ability to transfer compressive loads vertically to underlying competent soil strata with limited expansion of the drain laterally. Due to shear drain device's composite material layers surrounding the core aggregate, it creates multiple slip planes about the drain's exterior. The presence of the multiple slip planes about the shear drain devices' exterior ensures that most of the axial load applied to the drain will be resolved by end bearing resistance of the drain with reduced transfer of loading to the problematic soil strata and increased load transfer to the competent underlying soil, thus increasing bearing capacity, FIGS. 3 and 7.

As the shear drain devices are designed to be stiffer than the soft soil subgrade, the drains will carry some of the normal stress induced by surface loading that would have been supported directly by the soft soil. The diameter and spacing of the shear drain devices will determine the amount of surface load carried by the shear drain device. A tighter grid pattern will carry more load than a wide spaced grid pattern. The spacing of the drains can be optimized based on the degree of soil arching expected for the near surface soils. A surface layer of stronger stiffer material (such a reinforced ground mat) may additionally be utilized to optimize the shear drain device spacing.

The reinforcing mesh surrounding the exterior of the shear drain devices is strong in tensile strength. The reinforcing mesh surrounding the shear drain devices will resist hoop stress that would otherwise transfer as lateral pressure to the surrounding soil. This hoop stress applied to the reinforcing mesh in turn increases the stiffness of the shear drain device. The reduction in the amount of lateral transmission of the vertical force applied to the Shear drain devices can be best explained with use of Poisson's ratio. Poisson's ratio explains a materials tendency to expand in directions perpendicular to loading. Isotropic materials are described as exhibiting identical properties in all directions. Anisotropic material will exhibit different properties in different directions. The nature of the shear drain device makes them anisotropic. This anisotropic behavior of the shear drain devices leads to a low Poisson's ratio, meaning that the shear drain devices will experience more deformation vertically than they will laterally. A low Poisson's ratio means that at as the shear drain device is loaded vertically, less load is transferred laterally to the surrounding problematic soils and is effectively transferred through to the underlying competent soil.

By reducing the stresses on the compressible soils, the degree of consolidation or settlement will be reduced. The magnitude and distribution of excess porewater pressures induced with the soft compressible soils will be reduced as well. The overall increase in stiffness of the subgrade can be varied by adjusting the distribution of the shear drain devices. As the subgrade stiffness will be increased at the treatment area, transition zones, leading up to the treatment area, may be considered to provide a gradual increase in subgrade stiffness dependant on project requirements.

Excess porewater pressures are generated when a low permeable soil is subject to loading. Upon loading of the soil, much of the load is initially carried by the internal porewater and the water pressure is increased. Over time the excess porewater pressure will decrease as the water is squeezed out of the void space between the soil particles and the soil skeleton takes on more of the load. The rate of dissipation of the excess porewater pressure is affected by the magnitude of loading (initial porewater pressure response), the hydraulic conductivity of the soil, and the length of the drainage path for the pressure relief.

The dissipation of pore water pressure is an important objective in terms of improving soil conditions for settlement and strength. In terms of settlement, the rate of primary consolidation is a function of the rate of porewater dissipation. In terms of effective strength of soil, an increase in porewater pressure reduces the effective strength of soil. The effective strength will improve as the excess porewater pressures dissipate.

The shear drain device treatment provides highly permeable columns within the soil subgrade to accept water flow from within the soil subgrade. The flow of water is generated from the surface loading which induces excess porewater pressure within the soil. To be effective, the shear drain device is significantly more permeable than the surrounding soil. The diameter, location and spacing of the shear drain devices is important as this will act to provide a drainage path significantly shorter than the natural stratigraphy. The drainage path for a specific soil layer is typically 0.5 to 1.0 times the thickness of the layer (depending on drainage characteristics of the soil layers above and below the problematic soil). The shear drain device provides a permeable zone to accept excess porewater. Closely spaced shear drain devices can provide a shorter horizontal drainage path which will significantly increase the rate of porewater pressure dissipation from the soil.

Soil Densification: Densification of problematic soil is desirable in many applications. The denser the soil is, the stronger the soil will be able to act in terms of shear and bearing capacity. A denser soil will have improved consolidation properties (less settlement).

Shear drain devices can be installed using displacement methods to densify undesirably soft layers of soil. Shear drain devices can target specific layers of soil to be densified more or less than other layers to accomplished targeted levels of densification with the soil. Altering the method of auguring used to install the shear drain device can lead to different levels of lateral displacement within the soil. Higher displacement of the soil means an increased level of densification as the soil is compacted in-situ by forcing soil particles tighter together and groundwater outwards of the soil matrix. This can be considered as a means to improve the future compressibility of the soil and/or to reduce surcharge loading. However, with the additional squeezing of the soil, there will be an additional initial increase in excess porewater pressure which can temporarily reduce the effective shear strength. Where short term strength is critical, low displacement installation methods may be employed.

Increased Shear Resistance: Shear failure is a common mode of failure that often requires significant consideration in geotechnical engineering design. Insufficient shear strength within soils can lead to global instability and significant damage to infrastructure and significant weakening of the existing foundation soils (making construction more challenging). Where a lack of shear strength is present within the foundation soils, staged construction methods are often employed. Staged construction typically involves the construction of an embankment in time delayed increments to allow for consolidation and subsequent effective strength increases between stages. This can add months or even years to construction projects, at considerable additional cost.

Shear drain devices act to reduce the load on the soils (as discussed above) which means that there will be less shear strength required from the soil. The Shear drain devices improve the shear strength of the soils in three additional ways:

(i) Where displacement installation methods are used, shear drain devices can increase the shear strength by densifying the soil.

(ii) The increased rate of excess porewater pressure dissipation will lead to accelerated gains in effective shear strength.

(iii) The flexural rigidity of the shear drain device can be considered to transfer shear forces across a wider and deeper zone within the soil mass. This mechanical transference of shear force will mobilize additional shear resistance within the soil mass and transfer a portion of the shear force deeper to where the natural shear strength is higher. The moment resistance of the shear drain device itself will provide resistance to the shear force being applied as well.

The shear drain devices will act like a laterally loaded pile. The drains are stiff relative to the soil when loaded laterally due to presence of the core aggregate, semi-rigid perforated pipe and reinforcing mesh. The shear drain devices will provide mechanical lateral resistance to the soil by intercepting the shear interface and transferring a portion of the shear force deeper to where the underlying soil has higher shear resistance. The mechanical resistance of the shear drain device will help drive the preferential plane of shear failure deeper into the ground. The lower into the ground the shear plane reaches, the stronger the shear resistance of the soil along the shear plane will become. The level of shear force transfer will be a function of the allowable shear strain considered and the relative stiffness of the shear drain device and the soil. Shear drains may be considered to improve stability of slopes.

The rapid dissipation of excess porewater pressure of the soil allows for accelerated increased effective stress within the soil. Increased effective stress will lead to a higher obtainable effective shear strength.

The shear drain device ground improvement technique may be used for two typical project effects. This treatment can reduce and expedite ground settlements for projects where excessive ground settlements are identified as a key issue. On projects where the lack of shear strength of the soil is critical and staged construction measures are required, the shear drain device treatment can expedite construction staging through expedited porewater pressure dissipation and through added shear resistance.

Reduced and expedited ground settlements: Excessive ground settlement is a common problem that needs consideration in dealing with any foundation design. Foundations may fail from excessive or highly differential settlements. Excessive settlements can lead to unacceptable levels of displacement for structures or serviceability of road, parking areas, or site grades.

Settlement is a natural phenomenon, overtime soil particles become packed closer together due to many factors (loading, time, reductions in pore water). The shear drain devices can effectively reduce the amount of settlement incurred under a structure or embankment because of some its key aspects. The reduction of loading on compressible subgrade through the load capacity of the shear drain device will often lead to a reduction in settlement. With specific installation methods, the Shear drain device treatment can be used to densify the surrounding soil strata which can reduce settlements and reduce surcharge loads that may be required. The shear drain device's ability to expedite the dissipation of excess porewater pressures allows for significant amounts of settlement to be completed prior to the addition of the superstructure or pavement structure, thus reducing the amount post construction settlement.

Reduced Staging Time and Associated Costs: When dealing with weak foundation soils, low bearing capacity and global instability of foundations need to be considered. Staging times are often necessary during the construction process. Staging times are required to allow for excess porewater pressures to dissipate which increases the effective shear strength of the soil. The strength increase is required to allow construction of the next stage. To expedite construction of the next stage. Staging times can lead to months and even years of delay and can lead to significant costs due to those delays.

Shear drain devices act in several ways to aid in reduction of staging times by both improving global stability and expediting dissipation of excess porewater pressures.

The shear drain device can reduce the reduce loading on weak soil layers by use of the axial capacity of the shear drain devices to transfer some of the load to more competent soils below. This increases the global stability of each stage allowing for fewer stages.

The shear drain device provides added shear resistance within the weak soil layers which increases the global stability of each stage allowing for fewer stages.

The shear drain device's ability to expedite dissipation of excess porewater pressures can lead to a reduction in the time required between stages.

Various installation techniques are currently being reviewed to optimize installation in terms of efficiency and performance. These include auger methods, casing and driving methods, wash boring, vacuum excavation, and modified auger and/or casing heads.

Several shear drain device tips are being considered to address a wide variety of soil/rock types and conditions below the base of the soft soil strata to improve installation and performance of the system. These include expanded base treatments, dowels, sacrificial driving tips and/or augers, and rock points.

Installation of inclined or battered drains may be considered.

Various combinations of semi-rigid perforated piping, filter material, reinforcing mesh and aggregate in-filling are being considered to improve installation efficiency and to vary the stiffness and drainage properties of the shear drain device.

Various shear drain device spacing patterns are being reviewed to optimize the treatment and transition zones.

The shear drain device system is a ground improvement technique for weak and/or compressible soils. As compared to existing ground improvement treatments, the primary added benefits of the shear drain device are to provide improved load transfer through the problematic soil lays and to provide increased shear resistance. Due to the composite construction of the shear drain device, the overall design properties have been selected to provide the following characteristics: (i) Reduced loading on compressible soil layers; (ii) Expedited excess porewater pressure dissipation; (iii) Soil densification (soil strengthening); and (iv) Increase shear resistance.

The characteristic of the shear drain device contributes to reduced and expedited ground settlement while also providing added shear resistance within the foundation soils. The design of the system is also flexible and can be optimized to meet specific project requirements. These attributes can effectively reduce project timelines and costs.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method of preparing ground to receive a static load in which the ground includes a weak soil layer consisting of fine grained soil particles over a base layer and in which the static load defines a shear plane within the weak soil layer, the method comprising:
   providing a plurality of pipe members, each pipe member being elongated and including a hollow interior and a plurality of openings therein;
   providing a reinforcing member extending about each pipe member so as to provide tensile reinforcement at least in a circumferential direction about each pipe member;
   inserting each pipe member in an upright orientation within the fine grained soil particles of the weak soil layer such that fluid can readily pass through the openings in the pipe members from the fine grained soil particles surrounding the pipe members into the hollow interior of the pipe members; and providing aggregate fill occupying the hollow interior of each pipe member such that each pipe member with the reinforcing member thereon and the aggregate therein collectively defines a shear drain device that (i) traverses the shear plane associated with the static load to increase a shear strength of the fine grained soil particles within the weak soil layer and (ii) dissipates excess porewater pressure within the fine grained soil particles resulting from the static load.

2. The method according to claim 1 wherein the fine grained soil particles consist primarily of silt and/or clay.

3. The method according to claim 1 further comprising a dense layer of aggregate material laid over the weak soil layer, the method includes placing the shear drain devices to extend upwardly through the dense layer.

4. The method according to claim 1 further comprising placing the static load over the weak soil layer in the form of a preload layer of material over the shear drain devices in the weak soil layer.

5. The method according to claim 4 wherein the preload layer of material comprises a soil embankment, the method further comprising locating the shear drain devices in the fine grained soil particles of the weak soil layer in proximity to a boundary of the soil embankment.

6. The method according to claim 5 wherein the shear drain devices are located at a first distance to adjacent ones of the shear drain devices at a central location and the shear drain devices are located at a second distance to adjacent ones of the shear drain devices at the boundary of the soil embankment, the first distance being greater than the second distance.

7. The method according to claim 1 further comprising, subsequent to settling of the fine grained soil particles in the weak soil layer, filling a region surrounding the aggregate fill within the pipe members of the shear drain devices with concrete.

8. The method according to claim 1 wherein the base layer comprises dense soil having a greater shear strength than the fine grained soil particles of the weak soil layer, the method further comprising placing the shear drain devices such that the shear drain devices terminate at respective bottom ends within the base layer.

9. The method according to claim 1 further comprising providing a filter member extending as a continuous layer about the pipe member of each shear drain device, the filter member having an aperture size which is suitable to prevent entry of silt into the openings of the pipe member.

10. The method according to claim 9 including supporting the filter member and the tensile reinforcing member on the pipe member of each shear drain device so as to allow slippage between at least two of: (i) the filter member, (ii) the tensile reinforcing member, and (iii) the pipe member in a longitudinal direction of the shear drain device.

11. The method according to claim 1 wherein the pipe member of each shear drain device comprises a corrugated plastic pipe.

12. The method according to claim 1 wherein each shear drain device has a compressive strength in an axial direction which is greater than a corresponding compressive strength of the fine grained soil particles surrounding the shear drain device.

13. The method according to claim 1 further comprising placing each shear drain device such that a region of the fine grained soil particles surrounding each shear drain device is densified by a displacement of soil resulting from insertion of the shear drain device into the fine grained soil particles.

14. A shear resistant drain system comprising:
a weak soil layer consisting of fine grained soil particles over a base layer;
a static load received on the weak soil layer;
a plurality of shear drain devices inserted in an upright orientation within the fine grained soil particles so as to traverse a shear plane within the weak soil layer wherein the shear plane is associated with the static load on the weak soil layer, each shear drain device comprising:
a pipe member formed of semi-rigid material and having a hollow interior;
aggregate fill occupying the hollow interior of the pipe member;
a tensile reinforcing member extending about the pipe member providing tensile reinforcement at least in a circumferential direction about the pipe member; and
a plurality of openings in the pipe member which are arranged to allow communication of fluid from the fine grained soil particles surrounding the pipe member into the hollow interior of the pipe member so as to be arranged to reduce porewater pressure within the fine grained soil particles resulting from the static load.

15. The system according to claim 14 wherein the static load comprises a preload layer of material placed over the shear drain devices in the weak soil layer.

16. The system according to claim 15 wherein the preload layer of material comprises a soil embankment.

17. The system according to claim 16 wherein at least one of the shear drain devices is penetrated into the fine grained soil particles in proximity to a boundary of the soil embankment.

18. The system according to claim 17 wherein the shear drain devices are located at a first distance to adjacent ones of the shear drain devices at a central location and the shear drain devices are located at a second distance to adjacent ones of the shear drain devices at the boundary of the soil embankment, the first distance being greater than the second distance.

* * * * *